Sept. 3, 1957     F. J. METZGER     2,805,229

CATALYTIC OXIDATION OF ETHYLENE

Filed Aug. 6, 1953

INVENTOR
FLOYD J. METZGER

BY *Pennie Edmonds Morton Barrows Taylor*

ATTORNEYS

United States Patent Office 2,805,229
Patented Sept. 3, 1957

2,805,229

CATALYTIC OXIDATION OF ETHYLENE

Floyd J. Metzger, Stamford, Conn.

Application August 6, 1953, Serial No. 372,760

2 Claims. (Cl. 260—348.5)

In the catalytic oxidation of ethylene, the catalyst employed is usually metallic silver, with or without the addition of certain promoting agents, and the silver may be deposited on a support or carrier.

The catalytic oxidation of ethylene is an exothermic reaction. When an attempt is made to oxidize ethylene over a heated silver catalyst, two reactions may occur:

(1) $C_2H_4 + \frac{1}{2}O_2 \rightarrow C_2H_4O + 32.3$ kg. cal.
(2) $C_2H_4 + 3O_2 \rightarrow 2CO_2 + 2H_2O + 316.6$ kg. cal.

The first of these reactions results in the production of ethylene oxide, while the second, which is one of complete oxidation, results in the generation of a much larger amount of heat.

From the figures given in the above reactions, it is apparent that the oxidation is largely tied in with the removal of heat from the system and that the efficiency in the production of ethylene oxide is all important. As the yield of ethylene oxide increases and the complete oxidation of the second reaction decreases, the heat generated and which it is necessary to remove is greatly reduced. For example:

A 50% yield produces about 8,000 kg. cal. per kg. of $C_2H_4O$
A 60% yield produces about 5,500 kg. cal. per kg. of $C_2H_4O$
A 70% yield produces about 3,900 kg. cal. per kg. of $C_2H_4O$
A 75% yield produces about 3,100 kg. cal. per kg. of $C_2H_4O$
An 85% yield produces about 2,000 kg. cal. per kg. of $C_2H_4O$
A theoretical yield about 734 kg. cal. per kg. of $C_2H_4O$ Because of the exothermic nature of the reaction, the catalyst is commonly enclosed in relatively small tubes containing the silver catalyst on carriers such as pellets or broken up fragments and with the tubes surrounded by a heat controlling medium. A large commercial converter for the catalytic oxidation of ethylene may thus contain a large number of small tubes, each filled with the catalyst on the carrier and with the tubes enclosed in a larger chamber in which they are surrounded by the heat transfer fluid. The packing of a large number of tubes with such catalysts presents a special problem because of the varying resistance which the different tubes present to the flow of the gases therethrough. In order to obtain a uniform or approximately uniform rate of flow through a large number of tubes, each tube may require testing separately for space velocity and uniformity in resistance of gas flow.

The present invention utilizes an improved catalyst in which the catalytic metal such as silver is carried by tubular supports through which, and between a plurality of which, the gaseous mixture can flow with a minimum of frictional resistance.

The tubes which are used for supporting the catalytic metal are advantageously made of alumina, e. g., approximately 90% of alumina, with the balance essentially silica with small quantities of impurities. Such tubes can be prepared by extrusion and subsequent firing at comparatively high temperatures in order to sinter the mass and give a tube of suitable strength and rigidity. The catalyst carrier may thus be a single long tube with a single hole extending through it, such as a tube $5/16$ of an inch outside diameter and $3/16$ of an inch inside diameter and of varying lengths of e. g. from 1 to 5 feet or more. The material of the tube, such as Alundum or Carborundum, should be somewhat porous, advantageously with a water absorption of around 10% to 20% by weight and with a surface area of approximately 1 square meter per gram.

Such absorbent tubular carriers can be made of substantially uniform size and cross-section.

The catalyst is applied to these absorbent tubular supports to give an effective catalyst surface. A silver catalyst for the catalytic oxidation of ethylene to form ethylene oxide is advantageously formed and applied in the manner described in my companion application Ser. No. 372,816 by forming an ammoniacal silver solution, applying the solution to the tubular carrier and drying and heating to form a silver catalyst.

When ammonia is added to a neutral solution of a silver salt such as a solution of silver nitrate, there is first produced a white precipitate which rather quickly changes to a brown oxide or hydroxide which is readily soluble on further addition of ammonia. This further addition of ammonia results in the formation of a more or less complex compound or mixture of compounds of the silver or silver salt or silver oxide with ammonia.

I have discovered that when such an ammoniacal silver solution is applied to a carrier and the solution evaporated and gently heated, it produces an excellent and superior silver catalyst for the direct oxidation of ethylene to ethylene oxide.

This ammoniacal solution is applied to the tubular carrier in the form of a strong solution, after which the carrier as thus treated is dried and heated to produce the catalyst. This method of producing the catalyst eliminates the use of hydrogen to produce the silver catalyst and gives the catalyst directly on drying and heating.

The amount of silver applied to the tubular carrier can be varied, e. g., from less than 2% to 5% or more, but in general an amount around 3% of silver on the weight of the carrier is an advantageous amount.

The preparation of the catalyst with the use of an ammoniacal silver solution has the advantage that relatively strong solutions can be made and applied to the carrier, so that, for example, when an amount of solution of around 10% or 20% of the weight of the carrier is used and applied, it will give the desired amount of silver, e. g., 3%, in the final catalyst and the solution will be entirely absorbed by the carrier or on its surfaces.

The preparation of such a catalyst is illustrated by the following example:

To prepare a silver catalyst about 3% of silver on the weight of the carrier, an amount of silver nitrate is weighed out equivalent to the amount of silver desired, and this is dissolved in a very small amount of water to form a strong solution, and to this solution is added just sufficient ammonia to precipitate the silver as oxide or hydroxide and to redissolve the precipitate. Thus, where the amount of solution required for applying the silver to the carrier is 10% of the weight of the carrier, the amount of solution obtained on dissolving the silver nitrate, and after addition of the ammonia to precipitate and redissolve the precipitate, will be about 10 parts of solution containing 3 parts of silver. Where a larger or smaller amount of solution is desired for applying the ammoniacal silver to the carrier, the amount of water added to dissolve the silver nitrate can be correspondingly increased or decreased.

The ammoniacal solution of silver produced as described is a clear solution. This ammoniacal solution is added to the tubular carrier in an amount sufficient to give approximately 3% of silver based on the weight of the tubular carrier, and in an amount of solution just sufficient to wet the surface of the tubular carrier and to impregnate the carrier without any appreciable excess of the ammoniacal solution. The tubular carrier thus treated with the ammoniacal solution is dried, e. g., at a water bath temperature for a suitable period of time, e. g., from about 2 to 4 hours, and is then ready for its final treatment. The final treatment of the tubular catalyst involves heating it to a temperature to decompose the complex ammoniacal compounds and to give the silver directly in catalytically active form. The temperature of heating is thus at about 250° C. to 350° C. for a sufficient period of time, e. g., 6 to 10 hours, more or less.

The tubular catalyst thus obtained contains the silver in a particularly active form and in a form which is particularly adavntageous for the catalytic oxidation of ethylene.

While small individual tubes of carrier are advantageously used, the catalyst can also be extruded with a multiplicity of longitudinal and parallel holes or ducts extending through it and with the catalyst applied thereto.

In using such a tubular catalyst in a converter for the catalytic oxidation of ethylene, each tube may be of a size such that it can be contained in a somewhat larger outer metal tube. But advantageously a number of smaller catalyst tubes are arranged as a bundle in a larger metal tube, so that the gases will pass through the openings in the tubes and through the parallel spaces between the tubes.

The apparatus advantageously used in the process of the invention is a converter in which metal outer tubes have the small catalyst tubes within them arranged for flow of the gases through the outer tubes and through the openings in the catalyst tubes and in the spaces outside the catalyst tubes. With a number of metal tubes each containing the same number of small catalyst tubes, there is a minimum of resistance of flow of the gases through the various tubes, so that approximately uniform flow through a number of tubes is readily obtained.

The invention will be further described in connection with the accompanying drawing, which illustrates, in a somewhat conventional and diagrammatic manner, an apparatus adapted for carrying out the process of the invention, but it will be understood that the invention is not limited thereto.

In the accompanying drawing, which is of a conventional and somewhat diagrammatic character, Fig. 1 illustrates one form of multi unit converter partly in vertical section and partly in elevation;

Figure 1:
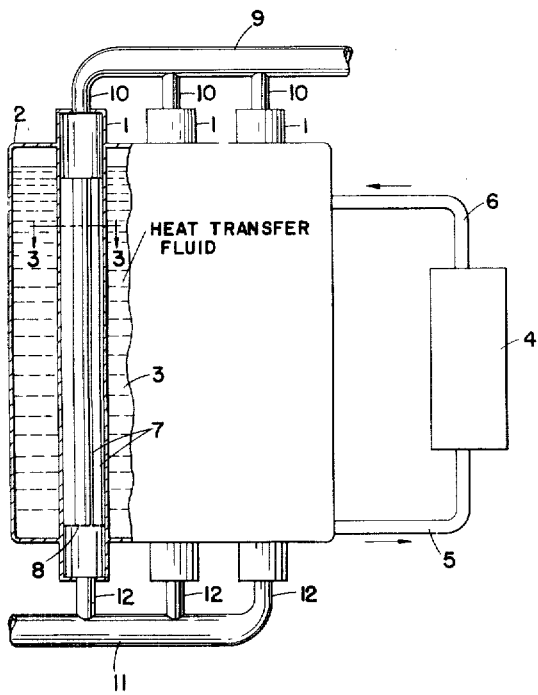
Figure 2:
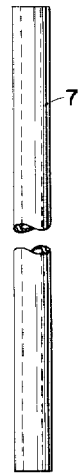
Fig. 2 illustrates one of the catalyst tubes, somewhat exaggerated for purposes of illustration.
Figure 3:
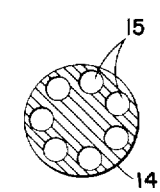
Fig. 3 is a horizontal section through one of the units of the converter taken on the line 3—3 of Fig. 1.

Fig. 1 illustrates a multi unit converter which, in practice, will be made with a large number of individual units, of which three units 1 are illustrated. These units are enclosed within an outer chamber or jacket 2 containing a heat transfer fluid 3 which is constantly withdrawn and circulated through the apparatus 4 where it is heated or cooled, with connecting pipes 5 and 6 connecting this apparatus to chamber 2. By using Dowtherm or other heat exchanging liquid, the converter can be heated to the proper temperature to begin the reaction, and heat of reaction can be neutralized by cooling the recirculating liquid. Each of the catalyst chambers or units 1 is shown as having four small catalyst tubes 7 therein, as indicated in Fig. 3. These tubes are supported in the catalyst chambers 1 by a screen support 8. With a catalyst chamber 1 having an internal diameter of 7/8 of an inch and with catalyst tubes having an outside diameter of 5/16 of an inch and an inside diameter of 3/16 of an inch, four of the catalyst tubes can readily be mounted in the catalyst chamber, as illustrated in Fig. 3. A gas inlet for the gaseous mixture, e. g., of ethylene and air, may be supplied to the catalyst chambers, as indicated at 9, with branch inlet pipes 10 leading to the different chambers. A common outlet pipe 11 is connected to the bottoms of the catalyst chambers through branch tubes 12.

Figure 4:
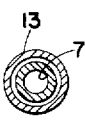
Fig. 4 is a horizontal section showing a modified arrangement of unit and catalyst tube.
Figure 6:
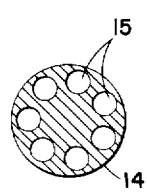
Fig. 6 is a cross-section of the tubular unit of Fig. 5.

A modified form of catalyst chamber is shown in Fig. 4 with a single outer steel pipe of e. g. 3/8 inch diameter containing a single catalyst tube.

Figure 5:
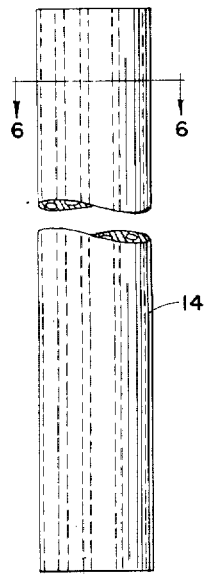
Fig. 5 illustrates a modified form of tubular catalyst with a number of longitudinal and parallel holes or ducts extending through it.

Fig. 5 shows a multi tubular catalyst 14 having a number of holes 15 extending longitudinally therethrough, through which the gaseous mixture passes. This larger tube, or a number of such tubes, will be enclosed in an outer metal tube which will form one of the units of a multi unit coverter.

The utilization of a tubular support for the carrier and the arrangement of such catalyst tubes in a larger metal tube, enables the gaseous mixture, e. g., of ethylene and air, to pass through the catalyst chamber through the openings in the tubes and through the spaces around the catalyst tubes with a minimum of frictional resistance, such that approximately uniform flow through a number of tubes can readily be obtained.

The utilization of the improved silver catalyst on such a tubular carrier has the added advantage of giving improved results in the catalytic oxidation of ethylene.

The advantages of the tubular catalyst in the catalytic oxidation of ethylene for the production of ethylene oxide will be illustrated by the following examples, in which individual catalyst chambers or units were used containing the tubular catalyst. In referring to the efficiency, in the following examples, this has reference to the percentage of the ethylene consumed which is converted to ethylene oxide. In referring to space velocity, this is used to indicate the number of displacements of the catalyst space per hour, that is, the relation of the total volume of gases passed through the space occupied by the catalyst to the volume of the catalyst space.

*Example 1.*—A silver catalyst was prepared as above described, containing 3% of silver deposited on a tubular carrier of alumina as above described. Four catalyst tubes were assembled as a bundle in a 7/8 inch inside diameter stainless steel tube, as illustrated in Fig. 3. Air containing 5.1% of ethylene was passed over the catalyst at a space velocity of about 300 and a temperature of about 270° C. The ethylene oxide produced was 1.35% and the efficiency was 75%.

In a series of 16 runs made with this converter and with variations in the space velocity, percentage of ethylene and temperatures, an average yield of ethylene oxide was produced of 1.11% with a maximum of 1.58%; and with an average efficiency of 69% and a maximum of 77½%.

*Example 2.*—In this example, a single catalyst tube was arranged in a stainless steel tube approximately 3/8 inch inside diameter, the catalyst tube being of the size above indicated. The catalyst was the same as that referred to in Example 1. Air containing 7.3% of ethylene was passed over the catalyst at a space velocity of about 630 and at a temperature of about 276° C. The percentage of ethylene oxide produced was 2.60, with an efficiency of 60.5%. In a series of 13 tests made with this apparatus and with varying the percent of ethylene, the space velocity and the temperatures, an average yield of ethylene oxide was obtained of 1.32%, with a maximum of 2.60%, and an average efficiency of 69%, with a maximum efficiency of 83%.

*Example 3.*—This test was carried out with a single catalyst tube arranged inside a ⅜ inch glass tube, the catalyst being the same as that in Example 1.

Air containing 5% of ethylene was passed over the catalyst at a space velocity of 1320 and a temperature of about 281 and gave a yield of 0.99% ethylene oxide with an efficiency of 71%.

In a series of runs made with varying percentages of ethylene, space velocity and temperatures, an average yield of 0.97% ethylene oxide was obtained, with a maximum of 1.55%; and with an average efficiency of 63.5% and a maximum efficiency of 70.5%.

The utilization of the improved silver catalyst above described with the tubular carrier for supporting the catalyst in the converter is particularly advantageous. The high yield and efficiency reduces the heat loss by exothermic reaction of complete oxidation and enables the process to be more readily controlled.

It is also one advantage of the improved catalyst on a tubular support that it is capable of operating over a considerable range of temperatures and with varying percentages of ethylene and with varying space velocities.

I claim:

1. In the catalytic oxidation of ethylene to form ethylene oxide in which a gaseous mixture containing ethylene, oxygen and an inert gas is passed at an oxidizing temperature through a series of silver-catalyst-containing metal tubes surrounded by a heat-controlling medium, the improvement which comprises passing the gaseous mixture through said tubes in the form of continuous, unobstructed, parallel, longitudinal streams of substantially uniform cross-section throughout their travel through the tubes and in contact throughout such travel with a catalyst made up of sintered, porous alumina having catalytic silver deposited thereon and therein from an ammoniacal silver solution by drying and heating to form a silver catalyst.

2. In the catalytic oxidation of ethylene to form ethylene oxide, in which a gaseous mixture containing ethylene, oxygen and an inert gas is passed at an oxidizing temperature through a series of silver-catalyst-containing metal tubes surrounded by a heat-controlling medium, the improvement which comprises providing the silver catalyst in said metal tubes in the form of small, long, sintered, porous alumina tubes having catalytic silver deposited thereon and therein from an ammoniacal silver solution by drying and heating to form the silver catalyst, and passing the gaseous mixture through continuous, longitudinal, unobstructed passages in said tubes and between said tubes and the metal tube.

References Cited in the file of this patent

UNITED STATES PATENTS

| | | |
|---|---|---|
| 2,010,217 | Canon | Aug. 6, 1935 |
| 2,404,574 | Hammond | July 23, 1946 |
| 2,415,531 | Porter | Feb. 11, 1947 |
| 2,424,083 | Finch | July 15, 1947 |
| 2,431,427 | Schulze | Nov. 27, 1947 |
| 2,444,059 | Ipatieff | July 6, 1948 |
| 2,475,822 | Cummings | July 12, 1949 |
| 2,475,855 | Peters | July 12, 1949 |
| 2,585,483 | Clifford | Feb. 12, 1952 |
| 2,587,468 | Heider | Feb. 26, 1952 |

FOREIGN PATENTS

| | | |
|---|---|---|
| 472,629 | Great Britain | Sept. 24, 1937 |

OTHER REFERENCES

McBee: Ind. and Eng. Chem. 37: 432–34 (1945).

UNITED STATES PATENT OFFICE
CERTIFICATE OF CORRECTION

Patent No. 2,805,229

September 3, 1957

Floyd J. Metzger

It is hereby certified that error appears in the printed specification of the above numbered patent requiring correction and that the said Letters Patent should read as corrected below.

Column 1, above the first paragraph, line 15, beginning with "In the catalytic" insert the following paragraph:

> This invention relates to improvements in the direct catalytic oxidation of ethylene to form ethylene oxide.

column 2, line 58, after "catalyst" insert -- containing --; column 3, line 23, for "adavntageous" read -- advantageous --.

Signed and sealed this 15th day of October 1957.

(SEAL)
Attest:
KARL H. AXLINE

Attesting Officer

ROBERT C. WATSON
Commissioner of Patents